(12) United States Patent
Kumar et al.

(10) Patent No.: US 8,045,024 B2
(45) Date of Patent: Oct. 25, 2011

(54) PRODUCING FULL-COLOR IMAGE WITH REDUCED MOTION BLUR

(75) Inventors: Mrityunjay Kumar, Rochester, NY (US); James E. Adams, Jr., Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 332 days.

(21) Appl. No.: 12/423,839

(22) Filed: Apr. 15, 2009

(65) Prior Publication Data
US 2010/0265370 A1    Oct. 21, 2010

(51) Int. Cl.
H04N 9/64 (2006.01)
H04N 5/228 (2006.01)
H04N 3/14 (2006.01)
H04N 5/335 (2011.01)
H04N 9/04 (2006.01)

(52) U.S. Cl. ............ 348/242; 348/222.1; 348/276; 348/279

(58) Field of Classification Search ............ 348/208.4, 348/208.6, 208.12, 208.13, 222.1, 241, 242, 348/248, 273, 276, 277, 279
See application file for complete search history.

(56) References Cited

U.S. PATENT DOCUMENTS

| | | | |
|---|---|---|---|
| 3,971,065 A | 7/1976 | Bayer | |
| 4,437,112 A | 3/1984 | Tanaka et al. | |
| 4,896,207 A | 1/1990 | Parulski | |
| 5,227,313 A | 7/1993 | Gluck | |
| 5,244,817 A | 9/1993 | Hawkins | |
| 5,323,233 A | 6/1994 | Yamagami et al. | |
| 5,506,619 A | 4/1996 | Adams, Jr. et al. | |
| 5,914,749 A | 6/1999 | Bawolek et al. | |
| 5,969,368 A | 10/1999 | Thompson et al. | |
| 6,011,875 A * | 1/2000 | Laben et al. | 382/276 |
| 6,097,835 A | 8/2000 | Lindgren | |
| 6,168,965 B1 | 1/2001 | Malinovich et al. | |
| 6,429,036 B1 | 8/2002 | Nixon et al. | |
| 6,441,848 B1 | 8/2002 | Tull | |
| 7,012,643 B2 | 3/2006 | Frame | |
| 7,239,342 B2 | 7/2007 | Kingetsu et al. | |
| 7,298,922 B1 | 11/2007 | Lindgren et al. | |

(Continued)

FOREIGN PATENT DOCUMENTS
EP    1 206 119 A2    5/2002

(Continued)

OTHER PUBLICATIONS
Joy, T., et al., "Development of a Production-Ready, Back-Illuminated CMOS Image Sensor with Small Pixels", Electron Devices Meeting, Dec. 2007. IEEE International, 1007-1010.*

(Continued)

*Primary Examiner* — Daniel M Pasiewicz
(74) *Attorney, Agent, or Firm* — Blakely Sokoloff Taylor & Zafman LLP (57) ABSTRACT

A method of forming a full-color output image using a color filter array image having a plurality of color channels and a panchromatic channel, comprising capturing a color filter array image having a plurality of color channels and a panchromatic channel, wherein the panchromatic channel is captured using a different exposure time than at least one of the color channels; computing an interpolated color image and an interpolated panchromatic image from the color filter array image; computing a transform relationship from the interpolated color image; and forming the full color output image using the interpolated panchromatic image and the functional relationship.

11 Claims, 7 Drawing Sheets

U.S. PATENT DOCUMENTS

| | | | |
|---|---|---|---|
| 7,315,014 B2 | 1/2008 | Lee et al. |
| 7,340,099 B2 | 3/2008 | Zhang |
| 7,615,808 B2 | 11/2009 | Pain et al. |
| 7,706,022 B2 | 4/2010 | Okuyama |
| 7,859,033 B2 | 12/2010 | Brady |
| 7,893,976 B2 | 2/2011 | Compton et al. |
| 7,915,067 B2 | 3/2011 | Brady et al. |
| 2003/0210332 A1 | 11/2003 | Frame |
| 2004/0007722 A1 | 1/2004 | Narui et al. |
| 2004/0207823 A1 | 10/2004 | Alasaarela et al. |
| 2004/0227456 A1 | 11/2004 | Matsui |
| 2005/0104148 A1 | 5/2005 | Yamamoto et al. |
| 2005/0128586 A1 | 6/2005 | Sedlmayr |
| 2006/0017829 A1* | 1/2006 | Gallagher ................ 348/276 |
| 2006/0017837 A1 | 1/2006 | Sorek et al. |
| 2006/0068586 A1 | 3/2006 | Pain |
| 2006/0119710 A1 | 6/2006 | Ben-Ezra et al. |
| 2006/0139245 A1 | 6/2006 | Sugiyama |
| 2006/0186560 A1 | 8/2006 | Swain et al. |
| 2006/0187308 A1 | 8/2006 | Lim et al. |
| 2007/0024879 A1 | 2/2007 | Hamilton et al. |
| 2007/0024931 A1* | 2/2007 | Compton et al. ........... 358/512 |
| 2007/0024934 A1 | 2/2007 | Adams, Jr. et al. |
| 2007/0046807 A1 | 3/2007 | Hamilton, Jr. et al. |
| 2007/0076269 A1 | 4/2007 | Kido et al. |
| 2007/0127040 A1 | 6/2007 | Davidovici |
| 2007/0159542 A1 | 7/2007 | Luo |
| 2007/0177236 A1 | 8/2007 | Kijima et al. |
| 2007/0194397 A1 | 8/2007 | Adkisson et al. |
| 2007/0223831 A1 | 9/2007 | Mei et al. |
| 2007/0235829 A1 | 10/2007 | Levine et al. |
| 2008/0012969 A1 | 1/2008 | Kasai et al. |
| 2008/0038864 A1 | 2/2008 | Yoo et al. |
| 2008/0084486 A1 | 4/2008 | Enge et al. |
| 2008/0123997 A1 | 5/2008 | Adams, Jr. et al. |
| 2008/0128598 A1 | 6/2008 | Kanai et al. |
| 2008/0130991 A1 | 6/2008 | O'Brien et al. |
| 2008/0165815 A1 | 7/2008 | Kamijima |
| 2008/0211943 A1 | 9/2008 | Egawa et al. |
| 2008/0218597 A1 | 9/2008 | Cho |
| 2008/0240602 A1 | 10/2008 | Adams, Jr. et al. |
| 2009/0016390 A1 | 1/2009 | Sumiyama et al. |
| 2009/0021588 A1 | 1/2009 | Border et al. |
| 2009/0021612 A1 | 1/2009 | Hamilton, Jr. et al. |
| 2009/0096991 A1 | 4/2009 | Chien et al. |
| 2009/0141242 A1 | 6/2009 | Silverstein et al. |
| 2009/0167893 A1 | 7/2009 | Susanu |
| 2009/0179995 A1 | 7/2009 | Fukumoto et al. |
| 2009/0195681 A1 | 8/2009 | Compton et al. |
| 2009/0206377 A1 | 8/2009 | Swain et al. |
| 2009/0268055 A1 | 10/2009 | Hamilton, Jr. et al. |
| 2009/0290043 A1 | 11/2009 | Liu et al. |
| 2010/0006909 A1 | 1/2010 | Brady |
| 2010/0006963 A1 | 1/2010 | Brady et al. |
| 2010/0006970 A1 | 1/2010 | Brady et al. |
| 2010/0026839 A1 | 2/2010 | Border et al. |
| 2010/0091169 A1 | 4/2010 | Border et al. |
| 2010/0104209 A1 | 4/2010 | Deever et al. |
| 2010/0119148 A1 | 5/2010 | Adams, Jr. et al. |
| 2010/0149396 A1 | 6/2010 | Summa et al. |
| 2010/0232692 A1 | 9/2010 | Kumar et al. |
| 2010/0245636 A1 | 9/2010 | Kumar |
| 2010/0265370 A1 | 10/2010 | Kumar et al. |
| 2010/0302418 A1 | 12/2010 | Adams, Jr. et al. |
| 2010/0302423 A1 | 12/2010 | Adams, Jr. et al. |
| 2010/0309340 A1 | 12/2010 | Border et al. |
| 2010/0309347 A1 | 12/2010 | Adams, Jr. |
| 2010/0309350 A1 | 12/2010 | Adams, Jr. et al. |
| 2011/0042770 A1 | 2/2011 | Brady |
| 2011/0059572 A1 | 3/2011 | Brady |

FOREIGN PATENT DOCUMENTS

| | | |
|---|---|---|
| EP | 1206119 | 5/2002 |
| EP | 1 322 123 A2 | 6/2003 |
| EP | 1322123 | 6/2003 |
| EP | 1612863 | 1/2006 |
| JP | 2005/099160 | 4/2005 |
| JP | 2005 099160 A | 4/2005 |
| JP | 2005/268738 | 9/2005 |
| JP | 2007/271667 | 10/2007 |
| JP | 2007 271667 A | 10/2007 |
| WO | WO-2007/030226 | 3/2007 |
| WO | 2007/089426 | 8/2007 |
| WO | WO-2007/089426 | 8/2007 |
| WO | WO 2007/089426 A1 | 8/2007 |
| WO | WO-2007/139675 | 12/2007 |
| WO | WO-2008/044673 | 4/2008 |
| WO | WO 2008/044673 A1 | 4/2008 |
| WO | WO 2008/066703 A2 | 6/2008 |
| WO | WO-2008/069920 | 6/2008 |
| WO | WO 2008/069920 A1 | 6/2008 |
| WO | WO-2008066703 | 6/2008 |
| WO | WO-2008/106282 | 9/2008 |
| WO | WO 2008/106282 A1 | 9/2008 |
| WO | WO-2008/118525 | 10/2008 |

OTHER PUBLICATIONS

Marius Tico et al.: "Image Stabilization Based on Fusing the Visual Information in Differently Exposed Images", Proceedings 2007 IEEE International Conference on Image Processing, ICIP 2007, Feb. 1, 2007, pp. 117-120, XP002609057, IEEE Piscataway, NJ, USA, ISBN: 978-1-4244-1436-9, Sections 1-2, p. 3.

Marius Tico et al.: "Motion Blur Identification Based on Differently Exposed Images", 2006 International Conference on Image Processing, Oct. 11, 1996, pp. 2021-2024, XP002609058, IEEE Piscataway, NJ, USA, ISBN: 1-4244-0481-9, Section 2, Abstract.

Yu-Wing Tai et al: "Image/Video Deblurring Using a Hybrid Camera", Computer Vision and Pattern Recognition, 2008. CVPR 2008. IEEE Conference On, IEEE, Piscataway, NJ, USA, Jun. 23, 2008, pp. 1-8, XP031297065, ISBN: 978-1-4244-2242-5.

DeBethune, Stanislas; Muller, Fabrice; Binard, Marc: "Adaptive Intensity Matching Filters: A New Tool for Multi-Resolution Data Fusion" [Online], Oct. 2, 1997, pp. 1-13, XP-002589570, Agard Conference Proceedings 595, Retrieved from the Internet: URL:http://orbi.ulg.ac.be/handle/2268/4739> [retrieved on Jun. 29, 2010], p. 4; figures 2, 3.

Debethune, Stanisla, et al., "Adaptive Intensity Matching Filters: A New Tool for Multi-resoultion Data Fusion", ]Online], Oct. 2, 1997, XP-002589570, Agard Conference Proceedings 595, Retrieved from the Internet: URL: http:/orbi.ulg.ac.be/handle/2268/4739, 1-13.

Joy, T., et al., "Development of a Production-Ready, Back-Illuminated CMOS Image Sensor with Small Pixels", Electron Devices Meeting, Dec. 2007. IEDM 2007. IEEE International, 1007-1010.

Marius, Tico, et al., "Image Stabilization Based on Fusing the Visual Information in Differently Exposed Images", Proceedings 2007 IEEE International conference on Image Processing, ICIP 2007 (Feb. 1, 2007), XP002609057, IEEE Piscataway, NJ USA, ISBN: 978-1-4244-1436-9, Sections 1-2, p. 3, 117-120.

Marius, Tico, et al., "Motion Blur Indentification Based on Directly Exposed Images", 2006 International Conference on Image Processing, Oct. 11, 1996, XP002609058, IEEE Piscataway, NJ, USA, ISBN: 1- 4244-0481-9, Section 2, Abstract, 2021-2024.

Yu-Wing, Tia, et al., "Image/Video Deblurring Using a Hybrid Camera", Computer Vision and Pattern Recognition, 2008, CVPR 2008, IEEE Conference On, IEEE, Piscataway, NJ, USA, Jun. 23, 2008, XP031297065, ISBN: 978-1-4244-2242-5, 1-8.

* cited by examiner

PRODUCING FULL-COLOR IMAGE WITH REDUCED MOTION BLUR

CROSS REFERENCE TO RELATED APPLICATIONS

Reference is made to commonly assigned U.S. application Ser. No. 12/401,002, filed Mar. 10, 2009 entitled CFA IMAGE WITH SYNTHETIC PANCHROMATIC IMAGE by Kumar et al., and U.S. application Ser. No. 12/412,429 filed Mar. 27, 2009 entitled PRODUCING FULL-COLOR IMAGE USING CFA IMAGE by Kumar et al., the disclosures of which is incorporated herein by reference.

FIELD OF THE INVENTION

The present invention relates to producing a full-color image with reduced motion blur from color filter array images having color channels and a panchromatic channel.

BACKGROUND OF THE INVENTION

An electronic imaging system depends on a lens system to form an image on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). A sensor comprises a two-dimensional array of individual picture element sensors, or pixels. Each pixel is typically provided with either a red, green, or blue filter, as described by Bayer in commonly assigned U.S. Pat. No. 3,971,065 issued Jul. 20, 1976, so that a color image can be produced. Regardless of electronic technology employed, e.g., CCD or CMOS, the pixel acts as a bucket in which photoelectrons are accumulated in direct proportion to amount of light that strikes the pixel during the capture of an image by the electronic imaging system.

Not all of the light that enters the front optical element of an electronic imaging system strikes a pixel. Much of the light is lost when passing through the optical path of the electronic imaging system. Typically, about 5% of the light is lost due to lens reflections and haze and about 60% is lost because of the color filter array. Moreover, some of the light strikes areas of the pixel that are not light sensitive. To gather the amount of light that is needed to make a correct exposure, the electronic imaging sensor gathers light for an interval of time called the exposure time. Based on brightness measurements of the scene to be imaged, an automatic exposure control is typically employed to determine a suitable exposure time that will yield an image with effective brightness. The dimmer the scene, the longer the amount of time the electronic imaging system needs to gather light to make a correct exposure. It is well known, however, that longer exposures can result in blurry images. This blur can be the result of objects moving in a scene. It can also be produced when the image capture device is moving relative to the scene during capture (e.g., due to camera shake).

One method to reduce blur is to shorten the exposure time. However, this method under-exposes the electronic image sensor during image capture so dark images are generated. An analog or digital gain can be applied to the image signal to brighten the dark images, but those skilled in the art will recognize that this will result in noisy images.

Another method to reduce blur is to shorten the exposure time and preserve more of the light that passes through the optical path and direct it to the pixels of the electronic image sensor. This method can produce images with reduced blur and acceptable noise levels. However, the current industry trend in electronic imaging systems is to make imaging systems smaller and less expensive. High-grade optical elements with large apertures, which can gather more light and preserve more light passing through them, are therefore not practicable.

Another method to reduce blur is to shorten the exposure time and supplement the available light with a photographic flash. A photographic flash produces a strong light flux that is sustained for a fraction of a second and the exposure time is set to encompass the flash time. The exposure time can be set to a significantly shorter interval than without a flash since the photographic flash provides strong illumination. Therefore, the blur during the exposure is reduced. However, flash photography is only practical if the distance between the flash and the object is relatively small. Additionally, a flash adds extra cost and weight to an image capture device.

U.S. Pat. No. 6,441,848 issued Aug. 27, 2002 to Tull describes a digital camera with an electronic image sensor that removes object motion blur by monitoring the rate at which electrons are collected by each pixel. If the rate at which light strikes a pixel varies, then the brightness of the image that the pixel is viewing is assumed to be changing. When a circuit built into the sensor array detects that the image brightness is changing, the amount of charge collected is preserved and the time at which brightness change was detected is recorded. Each pixel value where exposure was stopped is adjusted to the proper value by linearly extrapolating the pixel value so that the pixel value corresponds to the dynamic range of the entire image. A disadvantage of this approach is that the extrapolated pixel values of an object that is already in motion when the exposure begins are highly uncertain. The image brightness, as seen by the sensor, never has a constant value and, therefore, the uncertainty in the extrapolated pixel values results in an image with motion artifacts. Another disadvantage is that it uses specialized hardware so that it cannot be used with the conventional electronic image sensors that are used in current commercial cameras.

Another method to reduce blur is to capture two images, one with a short exposure time, and one with a long exposure time. The short exposure time is selected so as to generate an image that is noisy, but relatively free of motion blur. The long exposure time is selected so as to generate an image that has little noise, but that can have significant motion blur. Image processing algorithms are used to combine the two captures into one final output image. Such approaches are described in U.S. Pat. No. 7,239,342, U.S. Patent Application Publication No. 2006/0017837, U.S. Patent Application Publication 2006/0187308 and U.S. Patent Application Publication 2007/0223831. The drawbacks of these approaches include a requirement for additional buffer memory to store multiple images, additional complexity to process multiple images, and difficulty resolving object motion blur.

Another method to reduce blur is to shorten the exposure time and preserve more light passing through the color filter array. For silicon-based image sensors, the pixel components themselves are broadly sensitive to visible light, permitting unfiltered pixels to be suitable for capturing a monochrome image. For capturing color images, a two-dimensional pattern of filters is typically fabricated on the pattern of pixels, with different filter materials used to make individual pixels sensitive to only a portion of the visible light spectrum. An example of such a pattern of filters is the well-known Bayer color filter array pattern, as described in U.S. Pat. No. 3,971, 065. The Bayer color filter array has advantages for obtaining full color images under typical conditions; however, this solution has been found to have its drawbacks. Although filters are needed to provide narrow-band spectral response, any filtering of the incident light tends to reduce the amount of light that reaches each pixel, thereby reducing the effective light sensitivity of each pixel and reducing pixel response speed.

As solutions for improving image capture under varying light conditions and for improving overall sensitivity of the imaging sensor, modifications to the familiar Bayer pattern have been disclosed. For example, commonly assigned U.S. Patent Application Publication No. 2007/0046807 entitled "Capturing Images Under Varying Lighting Conditions" by Hamilton et al. and U.S. Patent Application Publication No. 2007/0024931 entitled "Image Sensor with Improved Light Sensitivity" by Compton et al. both describe alternative sensor arrangements that combine color filters with panchromatic filter elements, spatially interleaved in some manner. With this type of solution, some portion of the image sensor detects color; the other panchromatic portion is optimized to detect light spanning the visible band for improved dynamic range and sensitivity. These solutions thus provide a pattern of pixels, some pixels with color filters (providing a narrow-band spectral response) and some without (unfiltered "panchromatic" pixels or pixels filtered to provide a broad-band spectral response). This solution is not sufficient, however, to allow high quality images without motion blur to be captured under low-light conditions because the color pixels are still subject to motion blur.

Another method to reduce blur and capture images in low-light scenarios, known in the fields of astrophotography and remote sensing, is to capture two images: a panchromatic image with high spatial resolution and a multi-spectral image with low spatial resolution. The images are fused to generate a multi-spectral image with high spatial resolution. Such approaches are described in U.S. Pat. Nos. 7,340,099, 6,011,875 and 6,097,835. The drawbacks of these approaches include a requirement for additional buffer memory to store multiple images, and difficulty resolving object motion blur.

Another method that can be used to reduce motion blur is to use an image stabilization system having moveable lens system or special imager positioning hardware. Such systems are designed to keep the image in a stable position on the sensor. However, these systems have the disadvantage that they are complex and costly. Additionally, they do not address the case where objects in the scene are moving at different velocities.

Thus, there exists a need for producing an improved color image having reduced motion blur from color filter array image having color and panchromatic pixels without the use of a photographic flash, without increasing image noise, and without significant additional cost, complexity or memory requirements.

SUMMARY OF THE INVENTION

In accordance with the present invention, there is provided a method of forming a full-color output image using a color filter array image having a plurality of color channels and a panchromatic channel, comprising one or more processor(s) for providing the following:

a) capturing a color filter array image using a color filter array image sensor, the color filter array image having a plurality of color channels and a panchromatic channel, wherein the panchromatic channel is captured using a different exposure time than at least one of the color channels;

b) computing an interpolated color image and an interpolated panchromatic image from the color filter array image;

c) producing a synthetic panchromatic image from the interpolated color image;

d) determining a transform relationship between the synthetic panchromatic image and the interpolated color image; and e) forming the full color output image by using the transform relationship to process the interpolated panchromatic image.

An advantage of the present invention is that improved full-resolution color images with reduced blur can be produced without having to use a photographic flash or long exposure times to properly expose a single image.

A further advantage of the present invention is that full-resolution color images with reduced image capture device-induced blur can be produced without the need for a costly image stabilization system having moveable lens system or special imager positioning hardware.

A further advantage of the present invention is that full-resolution color images with reduced blur can be produced without increased buffer memory requirements for storing multiple images.

This and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Because digital cameras employing imaging devices and related circuitry for signal capture and correction and for exposure control are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
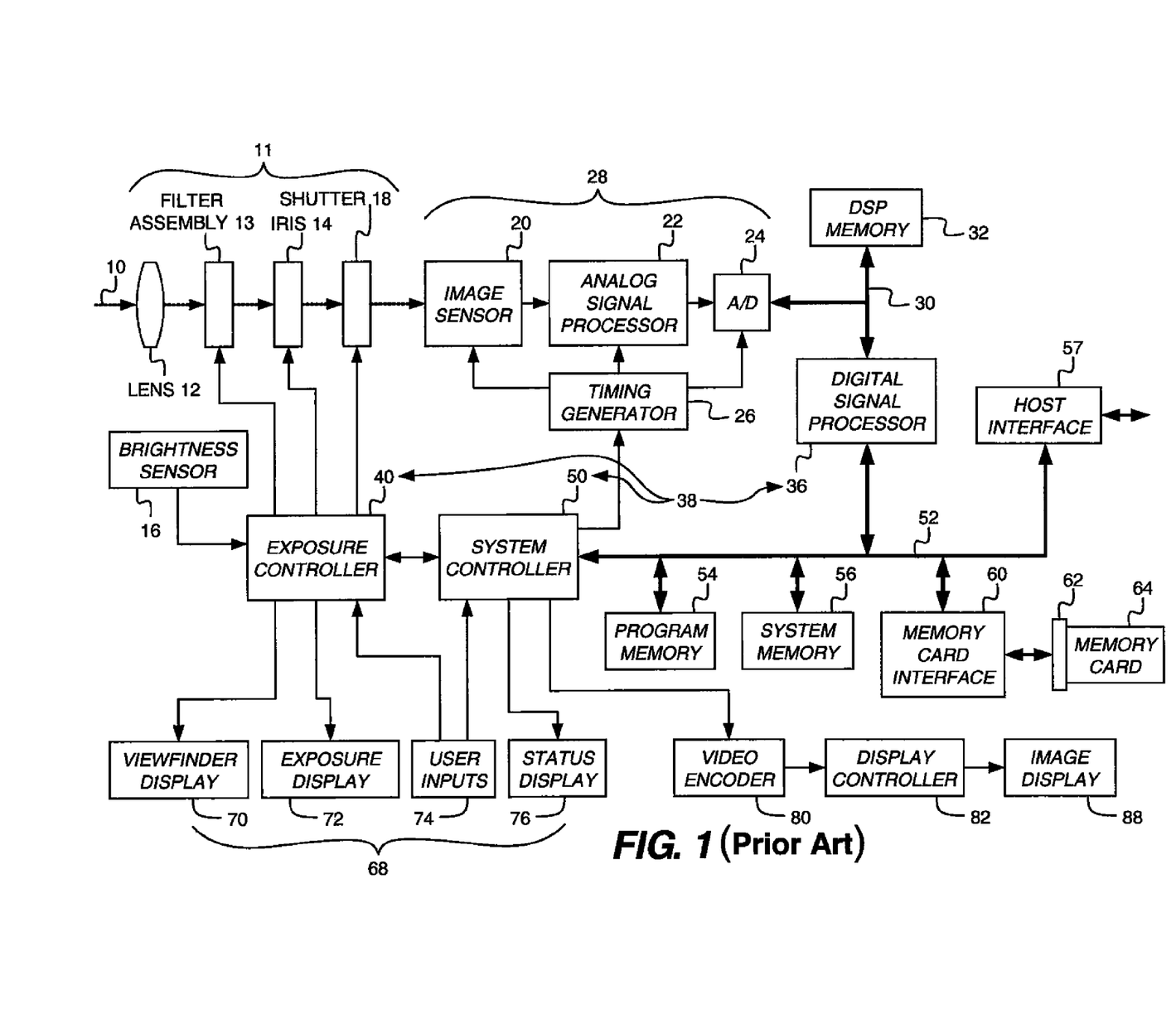
FIG. 1 is a block diagram of a digital camera for implementing the present invention.

Turning now to FIG. 1, a block diagram of an image capture device embodying the present invention is shown. In this example, the image capture device is shown as a digital camera. However, although a digital camera will now be explained, the present invention is clearly applicable to other types of image capture devices as well. In the disclosed camera, light from the subject scene 10 is input to an imaging stage 11, where the light is focused by lens 12 to form an image on a solid state color filter array image sensor 20. Color filter array image sensor 20 converts the incident light to an electrical signal for each picture element (pixel). The color filter array image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process.) Other types of image sensors having two-dimensional array of pixels can also be used provided that they employ the patterns of the present invention. The color filter array image sensor 20 for use in the present invention comprises a two-dimensional array of color and panchromatic pixels as will become clear later in this specification after FIG. 1 is described.

The amount of light reaching the color filter array image sensor 20 is regulated by an iris block 14 that varies the aperture and a neutral density (ND) filter block 13 that includes one or more ND filters interposed in the optical path. Also regulating the overall light level is the time that a shutter 18 is open. An exposure controller 40 responds to the amount of light available in the scene as metered by a brightness sensor block 16 and controls all three of these regulating functions.

This description of a particular camera configuration will be familiar to one skilled in the art, and it will be obvious that many variations and additional features are present. For example, an autofocus system can be added, or the lens can be detachable and interchangeable. It will be understood that the present invention can be applied to any type of digital camera, where similar functionality is provided by alternative components. For example, the digital camera can be a relatively simple point-and-shoot digital camera, where the shutter 18 is a relatively simple movable blade shutter, or the like, instead of the more complicated focal plane arrangement. The present invention can also be practiced using imaging components included in non-camera devices such as mobile phones and automotive vehicles.

The analog signal from the color filter array image sensor 20 is processed by analog signal processor 22 and applied to analog-to-digital (A/D) converter 24. A timing generator 26 produces various clocking signals to select rows and pixels and synchronizes the operation of analog signal processor 22 and A/D converter 24. An image sensor stage 28 includes the color filter array image sensor 20, the analog signal processor 22, the A/D converter 24, and the timing generator 26. The components of image sensor stage 28 can be separately fabricated integrated circuits, or they can be fabricated as a single integrated circuit as is commonly done with CMOS image sensors. The resulting stream of digital pixel values from the A/D converter 24 is stored in a digital signal processor (DSP) memory 32 associated with a digital signal processor (DSP) 36.

The DSP 36 is one of three processors or controllers in this embodiment, in addition to a system controller 50 and an exposure controller 40. Although this partitioning of camera functional control among multiple controllers and processors is typical, these controllers or processors can be combined in various ways without affecting the functional operation of the camera and the application of the present invention. These controllers or processors can include one or more digital signal processor devices, microcontrollers, programmable logic devices, or other digital logic circuits. Although a combination of such controllers or processors has been described, it should be apparent that one controller or processor can be designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in the DSP memory 32 according to a software program permanently stored in a program memory 54 and copied to DSP memory 32 for execution during image capture. DSP 36 executes the software necessary for practicing image processing shown in FIG. 18. DSP memory 32 can be any type of random access memory, such as SDRAM. The bus 30 including a pathway for address and data signals connects DSP 36 to its related DSP memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter block 13, iris block 14, and shutter 18 as previously described, directing the timing generator 26 to operate the color filter array image sensor 20 and associated elements, and directing DSP 36 to process the captured image data. After an image is captured and processed, the final image file stored in DSP memory 32 is transferred to a host computer via host interface 57, stored on a removable memory card 64 or other storage device, and displayed for the user on an image display 88.

A system controller bus 52 includes a pathway for address, data and control signals, and connects system controller 50 to DSP 36, program memory 54, a system memory 56, host interface 57, a memory card interface 60 and other related devices. Host interface 57 provides a high speed connection to a personal computer (PC) or other host computer for transfer of image data for display, storage, manipulation or printing. This interface can be an IEEE1394 or USB2.0 serial interface or any other suitable digital interface. Memory card 64 is typically a Compact Flash (CF) card inserted into memory card socket 62 and connected to the system controller 50 via memory card interface 60. Other types of storage that can be utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

A user interface 68, including all or any combination of a viewfinder display 70, an exposure display 72, a status display 76, the image display 88, and user inputs 74, is controlled by a combination of software programs executed on exposure controller 40 and system controller 50. User inputs 74 typically include some combination of buttons, rocker switches, joysticks, rotary dials or touchscreens. Exposure controller 40 operates light metering, exposure mode, autofocus and other exposure functions. The system controller 50 manages a graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens 12 and shutter 18 accordingly for subsequent captures. The brightness sensor block 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture, the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the resulting image will often contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to "bloom" into surrounding areas of the image. Therefore, it is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that are possible and are selected to reduce the cost, add features or improve the performance of the camera. The following description will disclose in detail the operation of this camera for capturing images according to the present invention. Although this description is with reference to a digital camera, it will be understood that the present invention applies for use with any type of image capture device having an image sensor with color and panchromatic pixels.

The color filter array image sensor 20 shown in FIG. 1 typically includes a two-dimensional array of light sensitive pixels fabricated on a silicon substrate that provide a way of converting incoming light at each pixel into an electrical signal that is measured. As the color filter array image sensor 20 is exposed to light, free electrons are generated and captured within the electronic structure at each pixel. Capturing these free electrons for some period of time and then measuring the number of electrons captured, or measuring the rate at which free electrons are generated can measure the light level at each pixel. In the former case, accumulated charge is shifted out of the array of pixels to a charge-to-voltage measurement circuit as in a charge coupled device (CCD), or the area close to each pixel can contain elements of a charge-to-voltage measurement circuit as in an active pixel sensor (APS or CMOS sensor).

Whenever general reference is made to an image sensor in the following description, it is understood to be representative of the color filter array image sensor 20 from FIG. 1. It is further understood that all examples and their equivalents of image sensor architectures and pixel patterns of the present invention disclosed in this specification is used for color filter array image sensor 20.

In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values.

Figure 2:
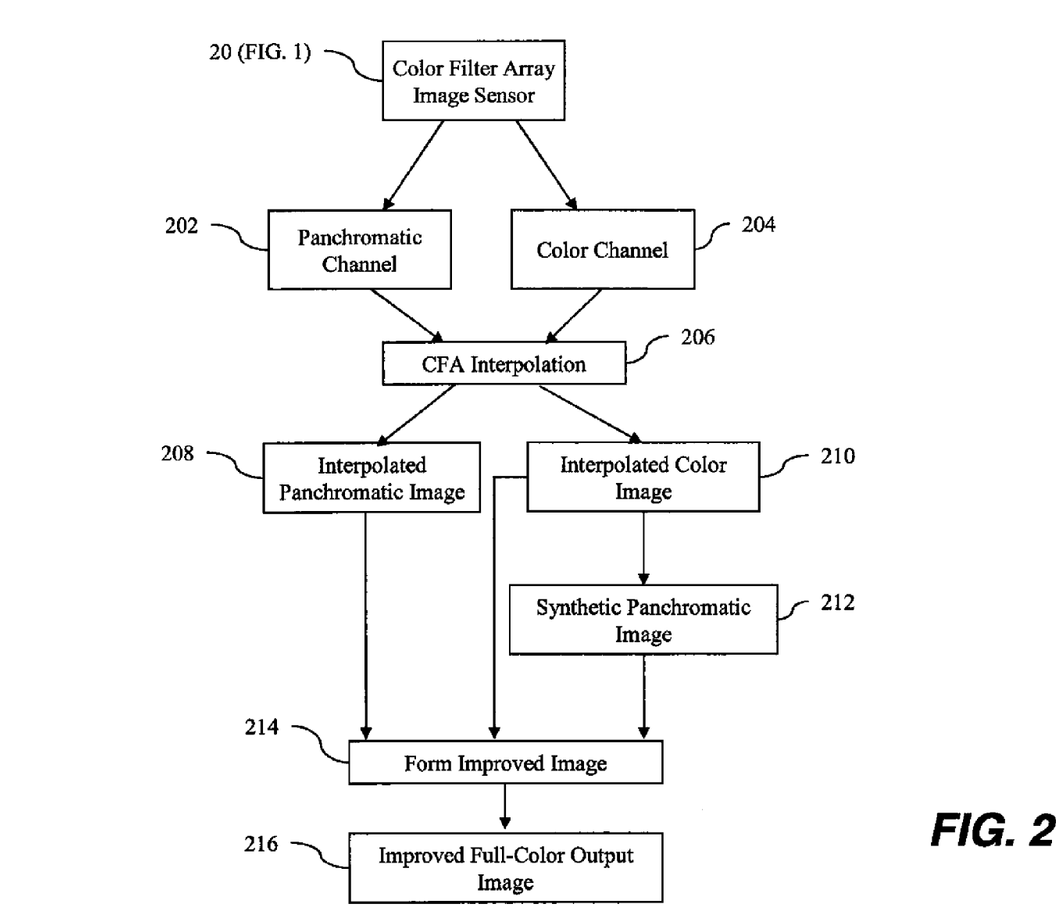
FIG. 2 is a block diagram of a preferred embodiment of the present invention.

FIG. 2 is a high level diagram of the preferred embodiment of the present invention representing a processor for carrying out the steps of the present invention. A color filter array image sensor 20 (FIG. 1) captures a color filter array image containing a panchromatic channel 202 and color channels 204 corresponding to at least two color photo responses. The color filter array can contain red, green, blue and panchromatic pixels, although other channel combinations are possible, such as cyan, magenta, yellow and panchromatic. Of particular importance is the inclusion of a panchromatic channel. The color filter array image is captured in such a way that the panchromatic channel is exposed to light for a different length of time than at least one of the color channels. The panchromatic channel will generally have a different exposure time than each of the color channels.

A color filter array (CFA) interpolation block 206 produces an interpolated panchromatic image 208 and an interpolated color image 210 from a color filter array image captured by the digital camera (FIG. 1). The interpolated color image 210 is used to compute a synthetic panchromatic image 212. In a preferred embodiment, the synthetic panchromatic image 212 is calculated as a weighted linear combination of the red, green and blue color channels of the interpolated color image 210. The weightings of the red, green and blue color channels of the interpolated color image produced by block 210 are chosen such that the computed synthetic panchromatic image 212 is comparable to the interpolated panchromatic image 208.

In the final step, the interpolated panchromatic image 208, the interpolated color image 210 and the synthetic panchromatic image 212 are used to generate an improved full-color output image 216 with reduced motion blur using a form improved image block 214.

Figure 3:
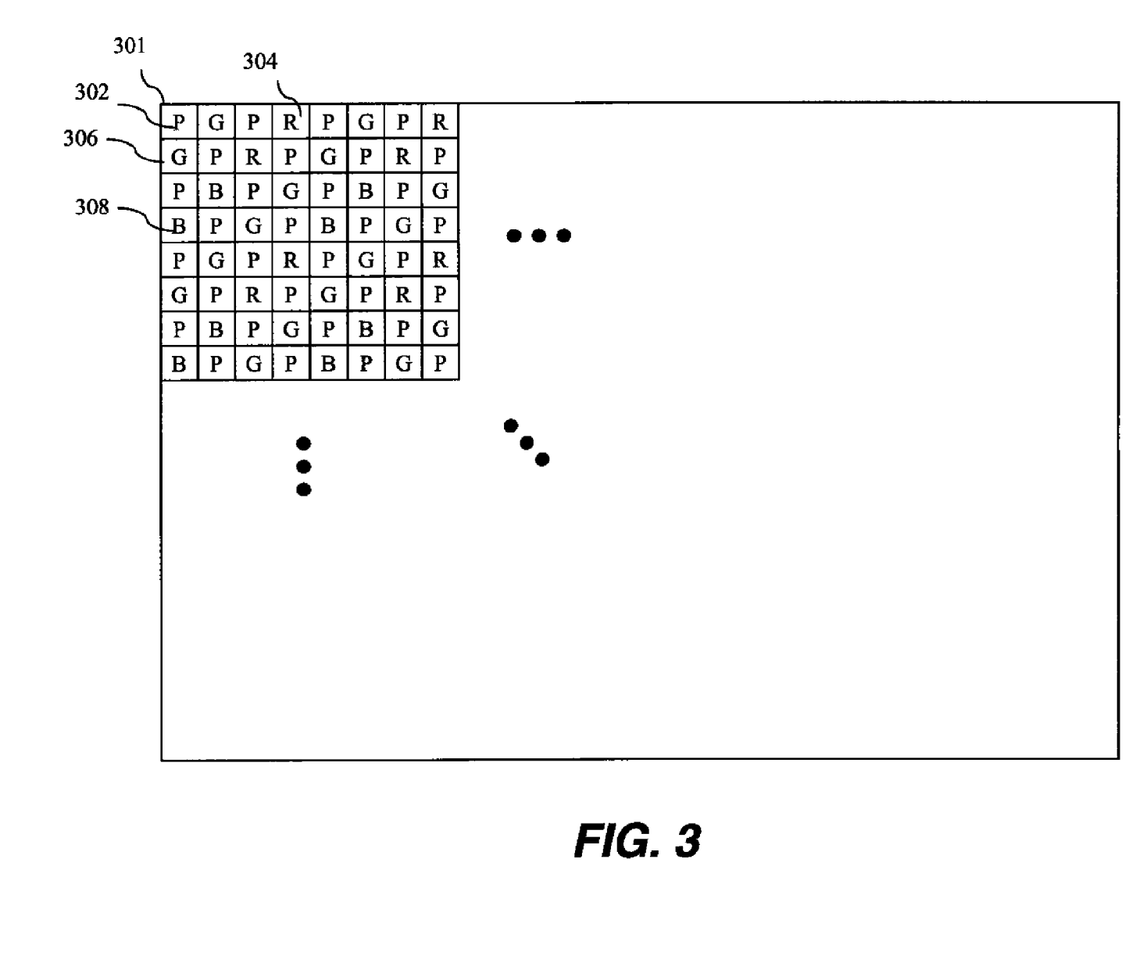
FIG. 3 is a view of a color filter array pattern that can be used for the present invention.

The individual steps outlined in FIG. 2 will now be described in greater detail. Initially, a digital camera (see FIG. 1) captures a color filter array image. FIG. 3 illustrates an example color filter array (CFA) pattern 301 for the preferred embodiment. In this example, approximately half of the pixels are panchromatic pixels 302, while the other half are split among red pixels 304, green pixels 306 and blue pixels 308.

The exposure time for the panchromatic pixels is shorter than the exposure time for the color pixels, thereby preventing excessive motion blur for the panchromatic pixels, while also allowing color data to be captured with sufficient exposure to reduce color noise artifacts. The exposure time for the panchromatic pixels and the color pixels can be controlled independently by adjusting the amount of time that the charge is accumulated for the different types of pixels.

Figure 4:
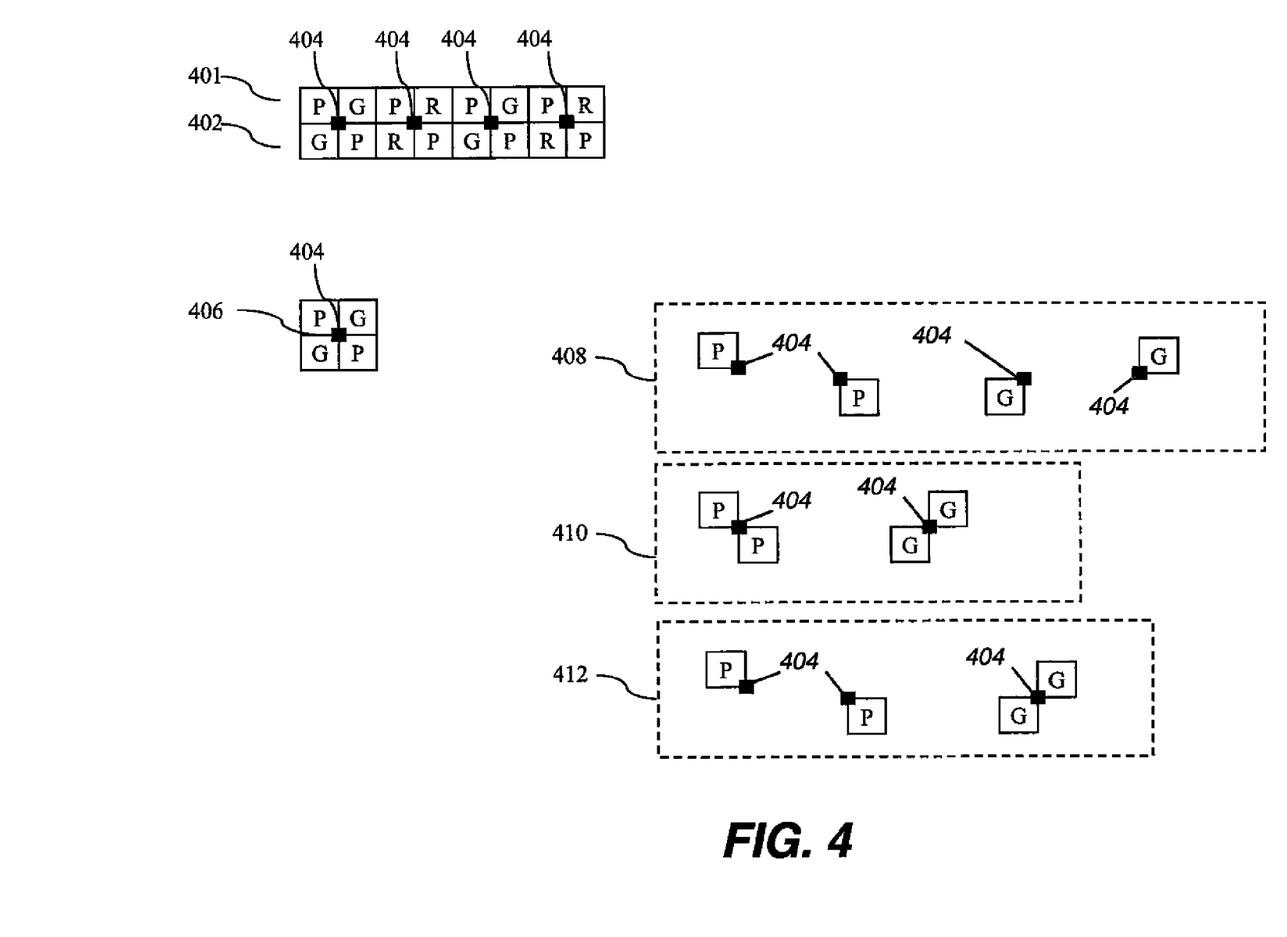
FIG. 4 is a schematic diagram showing how pixels in adjacent rows can be binned together, sharing the same floating diffusion component.

Various pixel-binning schemes are possible during readout of the image sensor, as illustrated in FIG. 4. In FIG. 4, two partial rows of an image sensor are displayed, a first partial row of image sensor 401 and a second partial row of image sensor 402. In this embodiment, the underlying readout circuitry for a sensor array uses a floating diffusion 404 that is switchably connected to one or more surrounding pixels at a time. Implementation and use of the floating diffusion 404 is well known to those skilled in the digital image acquisition art. FIG. 4 shows a conventional arrangement in which each floating diffusion 404 serves four surrounding pixels, shown in one example as a pixel quartet 406.

Pixel signals can be switched to the floating diffusion 404 in any of a number of combinations. In a first readout combination 408, each pixel in quartet 406 has its charge transferred separately to floating diffusion 404 and thus is read individually. In a second readout combination 410, panchromatic pixels P are binned, that is, they share floating diffusion 404 by emptying their stored charge to floating diffusion 404 at the same time; similarly, both color (G) pixels in the quartet are binned, switching their signals at the same time to floating diffusion 404. In a third readout combination 412, panchromatic pixels P are not binned, but are read separately; while the color pixels (G) are binned.

Figure 5:
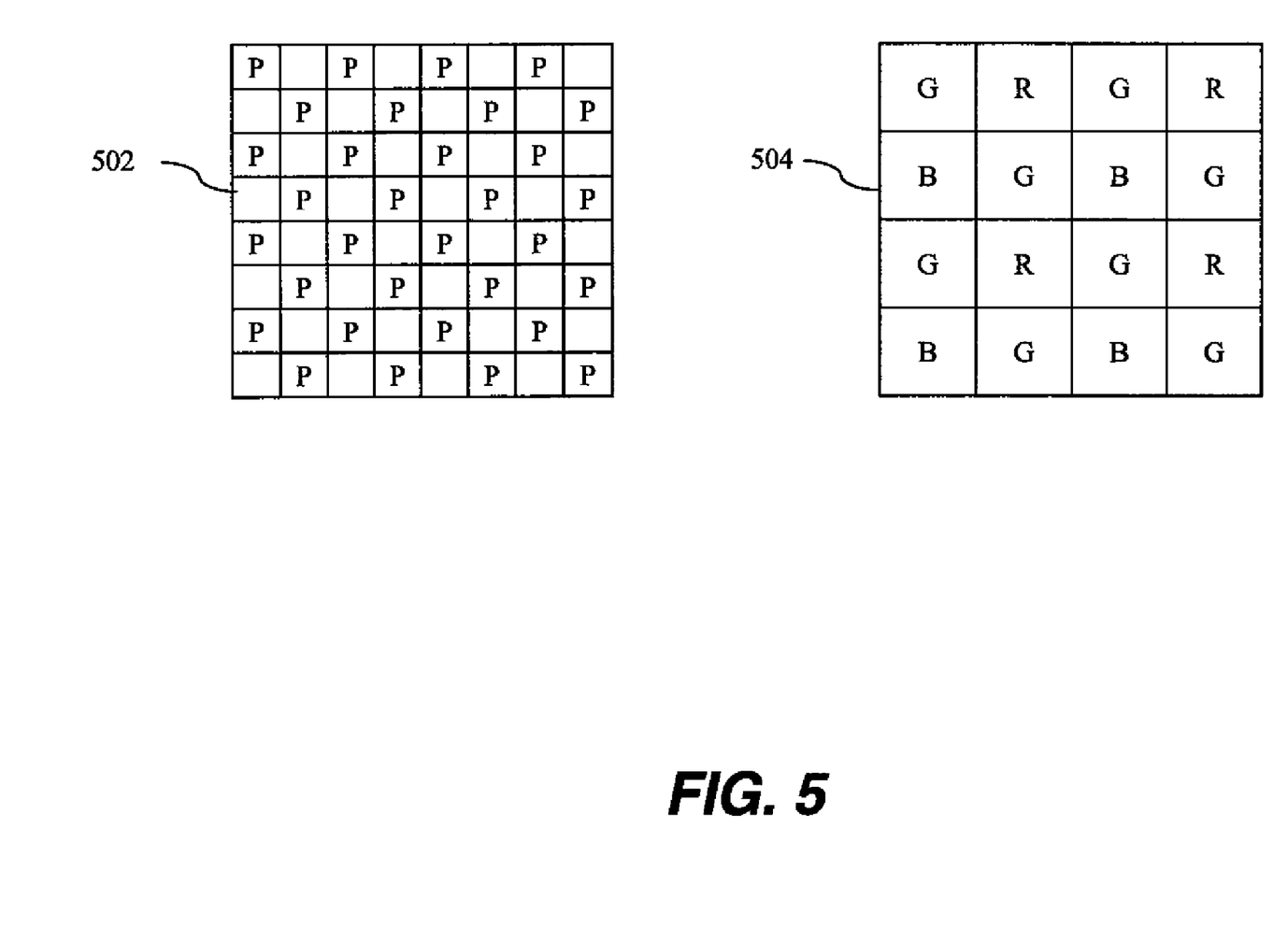
FIG. 5 is a view of the pixel readouts from a portion of the image sensor from one possible binning strategy.

In a preferred embodiment of the present invention, the panchromatic pixels for the panchromatic channel 202 (FIG. 2) are not binned, while color pixels for the color channels 204 (FIG. 2) are binned as in the third readout combination 412, resulting in the readouts illustrated in FIG. 5. In FIG. 5, the panchromatic pixels 502 occupy a checkerboard pattern, while the color pixels 504 collectively form a low resolution Bayer pattern.

The CFA interpolation block 206 (FIG. 2) produces the interpolated panchromatic image 208 and the interpolated color image 210 using a color filter array image containing a panchromatic channel 202 and color channels 204. Methods for performing CFA interpolation are well known in the art. For example, the CFA interpolation method described in U.S. Patent Application Publication No. 2007/0024934, which is incorporated herein by reference, can be used.

After CFA interpolation block 206 has produced the interpolated color image 210, the interpolated color image 210 is used to compute the synthetic panchromatic image 212. A computationally simple calculation for computing the synthetic panchromatic image 212 is given by L=R+2 G+B, where L is the pixel value of the synthetic panchromatic image 212 and R, G, B are the pixel values for the red, green and blue color channels, respectively, of the interpolated color image 210 (FIG. 2). In a preferred embodiment, the spectral responses of the red, green, blue, and panchromatic pixels are measured, as illustrated in FIG. 6, and the synthetic panchromatic image 212 is calculated as the weighted linear combination of red, green and blue ($L=a_1R+a_2G+a_3B$) that gives a best fit with the panchromatic curve.

Figure 6:
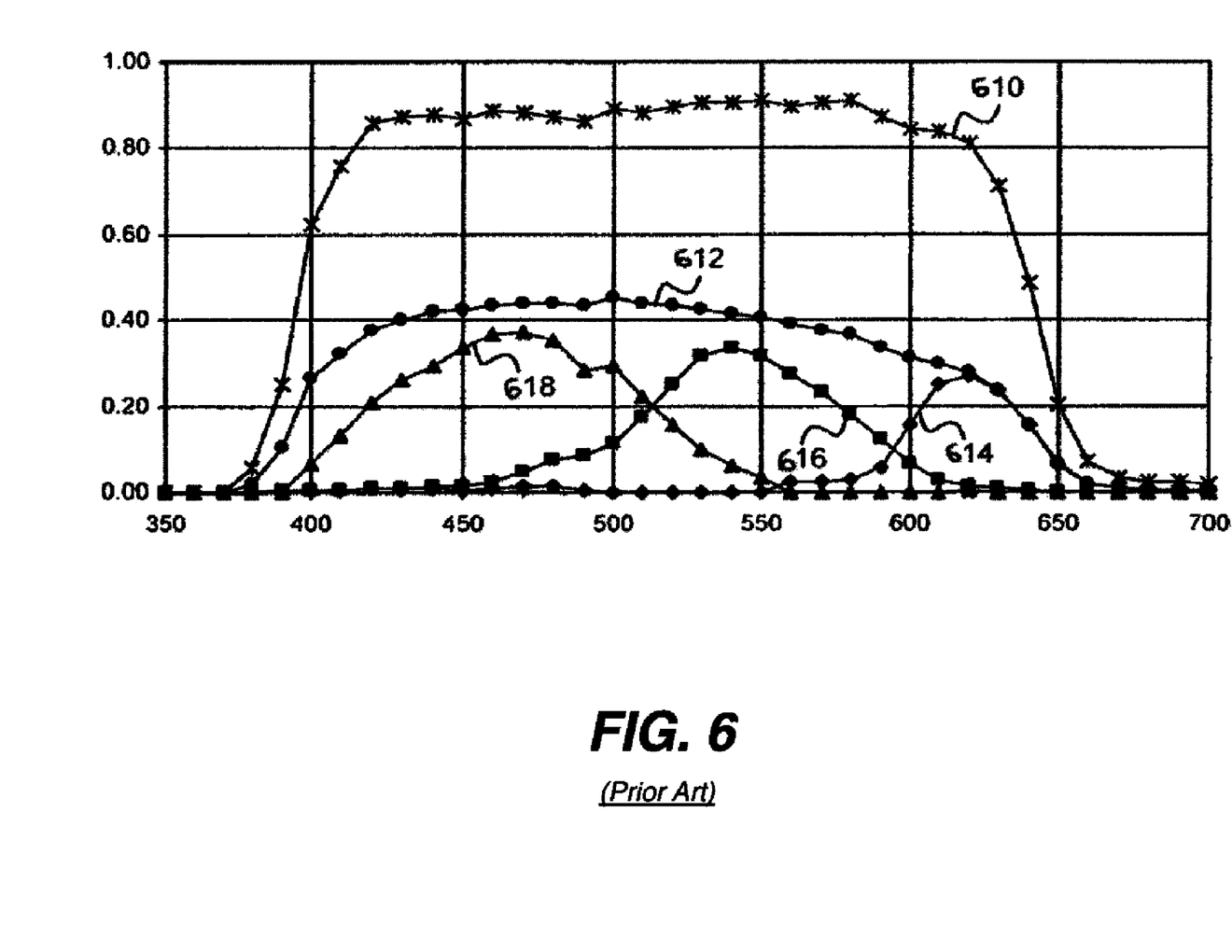
FIG. 6 provides representative spectral quantum efficiency curves for red, green, and blue pixels, as well as a wider spectrum panchromatic quantum efficiency, all multiplied by the transmission characteristics of an infrared cut filter.

Referring to the graph of FIG. 6, there are shown the relative spectral sensitivities of pixels with red, green, and blue color filters in a typical camera application. The x-axis in FIG. 6 represents light wavelength in nanometers, spanning wavelengths approximately from the near ultraviolet to the near infrared, and the y-axis represents efficiency (normalized). In FIG. 6, a bandwidth filter curve 610 represents the spectral transmission characteristic of a typical bandwidth filter used to block infrared and ultraviolet light from reaching the image sensor. Such a filter is needed because the color filters used for image sensors typically do not block infrared light, hence the pixels are unable to distinguish between infrared light and light that is within the passbands of their associated color filters. The infrared blocking characteristic shown by the bandwidth filter curve 610 thus prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by bandwidth filter curve 610 to produce the combined system quantum efficiencies represented by a red photoresponse curve 614 for the red color channel, a green photoresponse curve 616 for the green color channel, and a blue photoresponse curve 618 for the blue color channel. It is understood from these curves that each color photoresponse is sensitive to only a portion of the visible spectrum. By contrast, the photoresponse of the same silicon sensor that does not have color filters applied (but including the infrared blocking filter characteristic) is shown by a panchromatic photoresponse curve 612 for the panchromatic channel. By comparing the color photoresponse curves 614, 616, and 618 to the panchromatic photoresponse curve 612, it is clear that the panchromatic photoresponse can be two to four times more sensitive to wide spectrum light than any of the color photoresponses.

In the form improved image block 214 (FIG. 2), the interpolated panchromatic image 208, the interpolated color image 210 and the synthetic panchromatic image 212 are used to generate an improved full-color output image with reduced motion blur.

Figure 7:
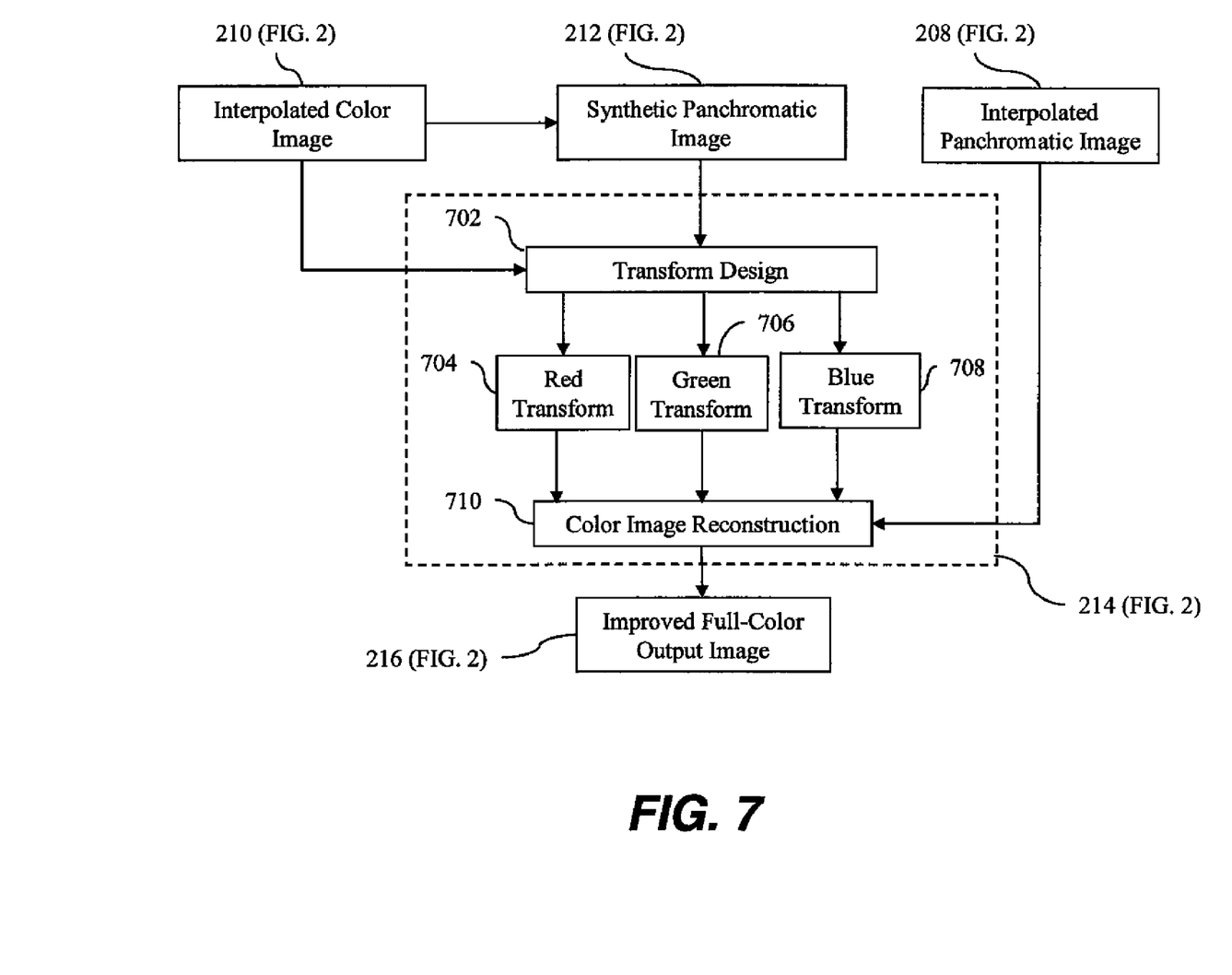
FIG. 7 is a block diagram showing step 214 of FIG. 2 in more detail.

FIG. 7 is a more detailed view of the form improved image block 214 from FIG. 2 according to a preferred embodiment of the present invention. A transform design step 702 uses the interpolated color image 210 (FIG. 2) and the synthetic panchromatic image 212 (FIG. 2) and produces a red transform 704, a green transform 706 and a blue transform 708. A color image reconstruction step 710 uses the interpolated panchromatic image 208 (FIG. 2) and the red, green and blue transforms produced at step 702 to produce the improved full-color output image 216 (FIG. 2) with reduced motion blur.

In FIG. 7, transform design step 702 can be performed in any appropriate way known to those skilled in the art. In a preferred embodiment of the present invention, the transforms produced by the transform design step 702 are frequency domain filters. One way to form the frequency domain filters to be used for the red transform 704, the green transform 706 and the blue transform 708 is described using Eqs. (1)-(3) below:

$$H_R = \frac{F_R}{F_{syntheticpan}} \quad (1)$$

$$H_G = \frac{F_G}{F_{syntheticpan}} \quad (2)$$

$$H_B = \frac{F_B}{F_{syntheticpan}} \quad (3)$$

where $F_{syntheticpan}$ is the Fourier transform of the synthetic panchromatic image 212 (FIG. 2); $F_R$, $F_G$ and $F_B$ are the Fourier transforms of the red, green, and blue color channels, respectively, of the interpolated color image 210 (FIG. 2); and $H_R$, $H_G$, and $H_B$ are the frequency domain filters for red, green and blue transforms, respectively. Those skilled in the art will recognize that the frequency domain filters can also be constructed using other filter design techniques.

In FIG. 7, the color image reconstruction step 710 can be performed in any appropriate way known to those skilled in the art. One way to perform the color image reconstruction step 710 according to a preferred embodiment of the present invention is described using Eqs. (4)-(6) below:

$$R^{New} = F^{-1}(H_R F_{pan}) \quad (4)$$

$$G^{New} = F^{-1}(H_G F_{pan}) \quad (5)$$

$$B^{New} = F^{-1}(H_B F_{pan}) \quad (6)$$

where $F_{pan}$ is the value of the Fourier transform of the interpolated panchromatic image 208 (FIG. 2); $F^{-1}(\cdot)$ is the inverse Fourier transform operator; and $R^{New}$, $G^{New}$ and $B^{New}$ are the red, green and blue color channel values, respectively, of the improved full-color output image 216 (FIG. 2).

In an alternate embodiment of the present invention, the interpolated color image 210 (FIG. 2), the synthetic panchromatic image 212 (FIG. 2) and the interpolated panchromatic image 208 (FIG. 2) can be subdivided into image tiles and the steps described using Eqs. (1)-(6) are performed on each image tile. This approach has the advantage that the computations are faster and more suited to constrained computing environments.

The algorithm for computing the improved full-color output image with reduced motion blur as disclosed in the preferred embodiment of the present invention can be employed in a variety of user contexts and environments. Exemplary contexts and environments include, without limitation, wholesale digital photofinishing (which involves exemplary process steps or stages such as digital images submitted for wholesale fulfillment, digital processing, prints out), retail digital photofinishing (digital images submitted for retail fulfillment, digital processing, prints out), home printing (home digital images in, digital processing, prints out), desktop software (software that applies algorithms to digital images to make them better—or even just to change them), digital fulfillment (digital images in—from media or over the web, digital processing, digital images out—on media, digital form over the internet), kiosks (digital images input, digital processing, prints or digital media out), mobile devices (e.g., PDA or cell phone that can be used as a processing unit, a display unit, or a unit to give processing instructions), and as a service offered via the World Wide Web.

In each case, the algorithm for computing the improved full-color output image with reduced motion blur can stand alone or can be a component of a larger system solution. Furthermore, the interfaces with the algorithm, e.g., the input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithms themselves can be fully automatic, can have user input (be fully or partially manual), can have user or operator review to accept/reject the result, or can be assisted by metadata (metadata that can be user supplied, supplied by a measuring device, e.g. in a camera, or determined by an algorithm). Moreover, the algorithms can interface with a variety of workflow user interface schemes.

The computation of improved full-color output image with reduced motion blur algorithm disclosed herein in accordance with the invention can have interior components that utilize various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

PARTS LIST

10 light from subject scene
11 imaging stage
12 lens
13 neutral density (ND) filter block
14 iris block
16 brightness sensor block
18 shutter
20 color filter array image sensor
22 analog signal processor
24 analog-to-digital (A/D) converter
26 timing generator
28 image sensor stage 30 bus
32 digital signal processor (DSP) memory
36 digital signal processor (DSP)
38 processing stage
40 exposure controller
50 system controller
52 system controller bus
54 program memory
56 system memory
57 host interface
60 memory card interface
62 memory card socket
64 memory card
68 user interface
70 viewfinder display
72 exposure display
74 user inputs
76 status display
80 video encoder
82 display controller
88 image display
202 Panchromatic channel
204 Color channels
206 color filter array (CFA) interpolation block
208 Interpolated panchromatic image
210 Interpolated color image
212 Synthetic panchromatic image
214 Form improved image block
216 Improved full-color output image
301 Color filter array (CFA) pattern
302 Panchromatic pixel
304 Red pixel
306 Green pixel
308 Blue pixel
401 First partial row of image sensor
402 Second partial row of image sensor
404 Floating diffusion
406 Pixel quartet
408 First readout combination
410 Second readout combination
412 Third readout combination
502 Panchromatic pixels
504 Color pixels
610 Bandwidth filter curve
612 Panchromatic photoresponse curve
614 Red photoresponse curve
616 Green photoresponse curve
618 Blue photoresponse curve
702 Transform design step
704 Red transform
706 Green transform
708 Blue transform
710 Color image reconstruction step

The invention claimed is:

1. A method of forming a full-color output image using a color filter array image having a plurality of color channels and a panchromatic channel, comprising one or more processor(s) for providing the following:
   a) capturing a color filter array image using a color filter array image sensor, the color filter array image having a plurality of color channels and a panchromatic channel, wherein the panchromatic channel is captured using a different exposure time than at least one of the color channels;
   b) computing an interpolated color image and an interpolated panchromatic image from the color filter array image;
   c) producing a synthetic panchromatic image from the interpolated color image;
   d) determining a transform relationship between the synthetic panchromatic image and the interpolated color image; and
   e) forming the full color output image by using the transform relationship to process the interpolated panchromatic image.

2. The method of claim 1 wherein the color channels of the interpolated color image are red, green and blue.

3. The method of claim 1 wherein the color channels of the interpolated color image are cyan, magenta and yellow.

4. The method of claim 1 wherein the synthetic panchromatic image is computed by performing a weighted summation of a plurality of color channels of the interpolated color image.

5. The method of claim 4 wherein the weights used in the weighted summation are determined from spectral responses of the color channels and the panchromatic channel.

6. The method of claim 1 wherein the color filter array image is subdivided into image tiles and transform relationships are determined for individual image tiles.

7. The method of claim 1 where individual transform relationships are determined for each color channel of the interpolated color image.

8. The method of claim 7 where the individual transform relationship for each color channel is defined by a frequency domain filter determined by computing the ratio of the Fourier transform of the corresponding color channel in the interpolated color image and the Fourier transform of the synthetic panchromatic image.

9. The method of the claim 8 wherein each color channel of the full color output image is formed by multiplying the Fourier transform of the interpolated panchromatic image by the frequency domain filter determined for the corresponding color channel and computing the inverse Fourier transform.

10. The method of claim 8 wherein the color filter array image is subdivided into image tiles and frequency domain filters are determined for individual image tiles.

11. The method of claim 1 wherein the full color output image has a reduced level of motion blur relative to the interpolated color image.

* * * * *